T. CRANEY.
SAW-MILL DOG.
No. 7,453. Reissued Jan. 2, 1877.
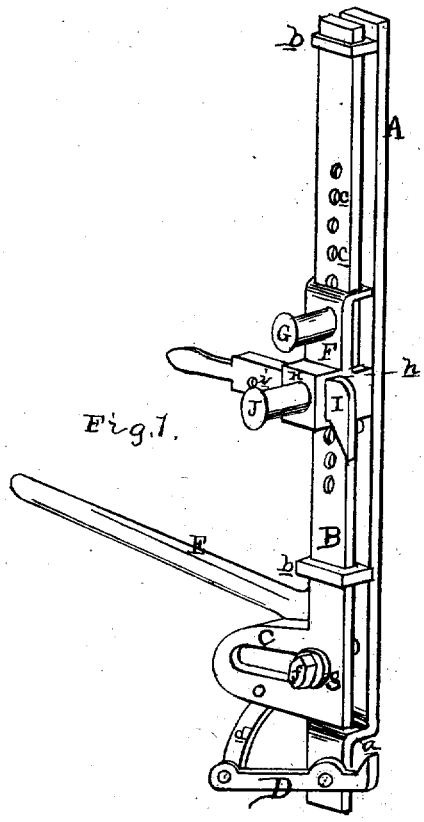
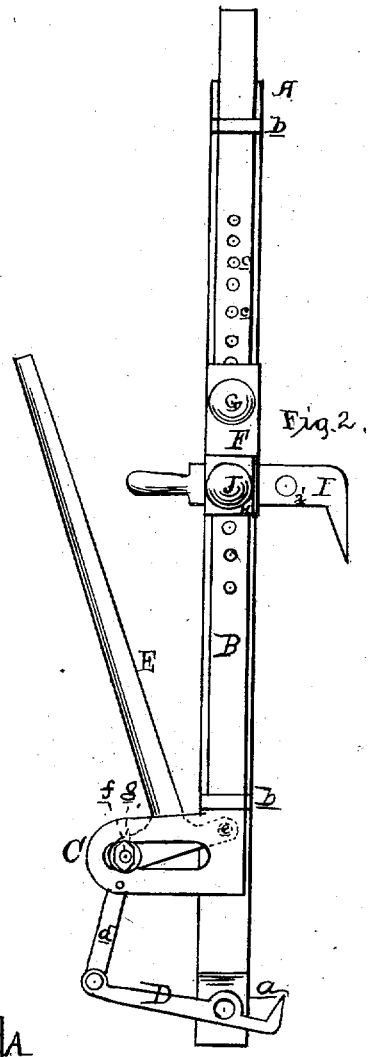
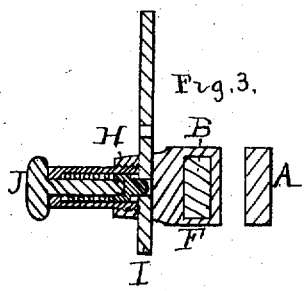
ATTEST
Chas. Thurman.
R. A. P. Dyer.
INVENTOR
Thomas Craney.
per Geo. W. Dyer & Co.
Attys.
N. PETERS, PHOTO-LITHOGRAPHER, WASHINGTON, D. C.

UNITED STATES PATENT OFFICE.

THOMAS CRANEY, OF BAY CITY, MICHIGAN.

IMPROVEMENT IN SAW-MILL DOGS.

Specification forming part of Letters Patent No. 150,534, dated May 5, 1874; reissue No. 7,453, dated January 2, 1877; application filed August 18, 1875.

*To all whom it may concern:*

Be it known that I, THOMAS CRANEY, of Bay City, in the county of Bay and State of Michigan, have invented an Improvement in Saw-Mill Dogs, of which the following is a specification:

The object of my invention is to so construct the dogs for a circular-saw mill as to enable the sawyer to readily secure the log, before it has been slabbed, to the carriage, and, after slabbing, to secure the cant in such a manner that it may be sawed up to the last inch-board without again adjusting the dogs.

The invention consists, first, in a dog that is horizontally adjustable in a head that is vertically adjustable upon a dog-bar, having a vertical movement upon the standard through a lever or levers; secondly, in the combination, with the dog-bar, of a dog-bar pivoted to the lower part thereof, for dogging the lower edge of a cant, and actuated by the same lever which operates the main dog-bar.

Figure 1 is a perspective view of my improved mill-dog. Fig. 2 is a side elevation. Fig. 3 is a cross-section.

In the drawing, A represents the bar or standard which carries the working parts, and which should be bolted to the side of the knee-standard. Near the lower end there is an offset, *a*, and at the top and near the bottom there are guide-loops *b b*, in which a dog-bar, B, has a vertical movement. The upright part of the bar B has numerous holes, *c*, drilled in it, and the lower end has forged on it, or is bent to form, a foot, C, projecting horizontally to the rear, in which foot there is a horizontal slot. D is a lever-dog, pivoted to the offset *a* at the lower end of the bar B, and to its rear end is pivoted a connecting-bar, *d*, whose upper end is pivoted to the rear end of the arm of the lever E by the wrist-bolt *f*. E is a T-shaped lever, one arm of which is pivoted, at *e*, to the standard A, and the other arm is provided with a wrist-bolt, *f*, on which is sleeved a friction-roller, *g*, which plays in the slot of the foot C. F is a sliding head, having a vertical adjustment on the dog-bar B, and is fitted with a spring-bolt, G, which enters one of the holes *c*, and thus locks the head at any desired elevation. Below the bolt G there is an offset, H, formed on the sliding head, through which offset a horizontal slot is made. Through the slot is inserted the shank of a dog, I, having a series of perforations, *i*, with one of which a spring-bolt, J, may engage to lock the dog, which is thus adjustable, so as to engage with a log at a considerable distance from the standard, or when retracted to dog a cant close to the edge.

When a log is rolled onto the carriage, the lever E is thrown up to raise the dog-bar and dog I, so that the log may lie against the standard. The dog I is adjusted to the position shown in Fig. 2, so that, when the lever is thrown down, the hook of said dog will be forced into the log, to hold it while being slabbed.

After the log is slabbed and squared, the lever E is thrown up to release the dog I from its engagement with the log, when said dog is to be retracted to the position shown in Fig. 1, the hook projecting less than an inch from the face of the standard, against which the side of the cant is placed, and is secured in position by a downward movement of the lever, which forces the dog I into the top of the cant, near the edge, and at the same time the hook of the dog D is forced up into the bottom of the cant, near the inner face thereof.

In this manner the two dogs rigidly secure the said cant in position until sawed up to the last inch board without further adjustment of the dogs.

What I claim as my invention is—

1. The combination, with the standard A, of the vertically-moving dog-bar B, the head F, sliding vertically upon the said dog-bar, and the dog I, adjusted horizontally in the said head, substantially as described and shown.

2. The combination, with the standard A, of the vertically-moving dog-bar B, the adjustable dog I, the lower dog D, and the lever E, pivoted to the standard, and operating both the said dog-bar and lower dog, substantially as described and shown.

3. The combination of the dog-bar B, sliding head F, and spring-bolts G J with the adjustable dog I, substantially as set forth.

4. The combination of the dog-bar B, head F, dog I, and spring-bolts G J with the lever E, connecting-bar *d*, and dog D, substantially as and for the purposes set forth.

THOMAS CRANEY.

Witnesses:

JOHN HARGODON,
C. WHITTEMORE.